March 14, 1967   R. E. PALMER   3,309,155
WHEEL BEARING
Filed April 16, 1964

INVENTOR.
ROBERT E. PALMER
BY
ATTORNEY.

United States Patent Office 3,309,155
Patented Mar. 14, 1967

3,309,155
WHEEL BEARING
Robert E. Palmer, Bay Village, Ohio, assignor to Palmer, Incorporated, Bay Village, Ohio, a corporation of Ohio
Filed Apr. 16, 1964, Ser. No. 360,295
4 Claims. (Cl. 308—191)

My invention relates to wheel bearing mountings, whether ball or roller, and, although in no wise limted to such application is particularly adapted to ball or roller bearings used in mountings for the wheels of weapons skids.

Conducive to a better understanding of the invention, it may be well to point out that vehicle wheels are commonly mounted for free rolling on axles engaged through ball or roller bearings. There being two sets of such spaced bearing units, the outer races of which are mounted in the wheel hub by means of a press, or force, fit, while the inner races engage the axle spindle through sliding fits.

The so mounted wheel is secured on the spindle by means of a castle-nut, which is drawn up against the outer face of the inner race of the outer-most bearing in the wheel hub.

The optimum position of the castle-nut is such that it just contacts the inner race without putting any axial end-thrust, or pre-loading, thereagainst.

The so adjusted castle-nut is held against further rotation by means of a cotter-pin which extends through one of the castle-nut slots and a diametrical bore through the threaded end of the axle spindle.

It is practically impossible to be able to lock a castle-nut at the exact position where it just contacts the inner bearing race, to keep the wheel on the axle without any pre-loading.

It nearly always has to be backed off or tightened a trifle to enable the cotter-pin to be properly engaged.

If backed off, the so mounted wheel will have a tendency to wobble. If tightened beyond the optimum setting, the inner race is pushed out of line with the outer race with consequent pre-loading of the bearing, producing a frictional drag which increases the force required to start the vehicle from a standing position. This condition may not be objectionable in a motor driven vehicle, but in the case of weapons skids, which often have to be moved from a standing position, by man power, such frictional drag cannot be tolerated.

The primary object of this invention, therefore, is to provide means for mounting a ball, or roller bearing vehicle wheel, on its supporting axle in a manner whereby the bearing cannot be pre-loaded in axial thrust no matter how tightly the wheel retaining castle-nut is drawn up.

Another object is to provide such a bearing, in cases wherein a certain amount of pre-loading may be desirable, that cannot be pre-loaded beyond a predetermined amount.

A further object is to provide a bearing assembly, as aforesaid, of such structural simplicity that it can be assembled rapidly and inexpensively.

Still another object is to provide a bearing mounting that will be strong and rugged and which will be capable of long and reliable use under severe operating conditions.

These and other objects of the invention will become apparent from a reading of the following specification and claims, together with the accompanying drawing, wherein like parts are referred to and indicated by like reference numerals and wherein:

Figure 1:
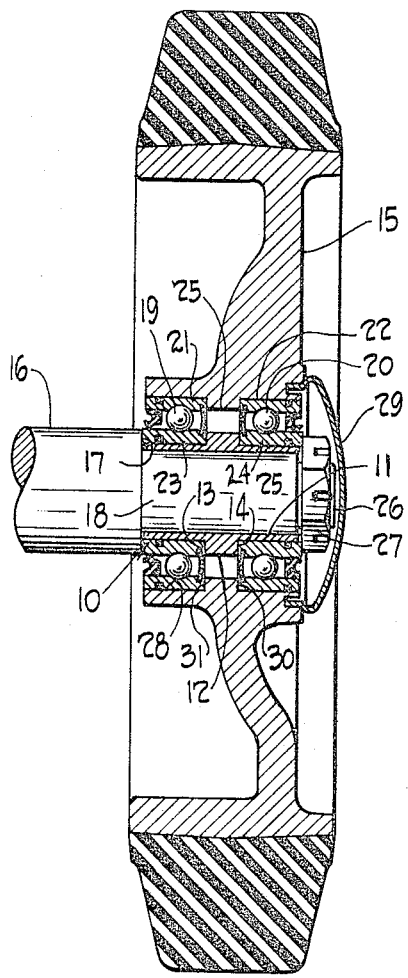
FIGURE 1 is a vertical sectional view through a mounted vehicle wheel having a ball bearing mounting assembly made in accordance with this invention.

Referring more particularly to the drawing, there is seen in FIGURE 1 a vehicle wheel 15 mounted on a vehicle axle 16 through a pair of spaced ball bearing units 19 and 20.

The axle 16 has an end spindle 18 of cylindrical shape, and of smaller diameter, joined thereto through a shoulder 17.

The spindle 18 hts a threaded stud 26 at the outer end thereof.

The hub of the wheel 15 has a bore 28 therethrough with an annular spacer 25 centered therein.

The hub spacer 25 has end shoulders 30 and 31.

Figure 2:
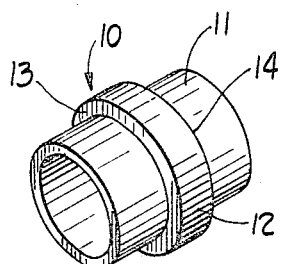
FIGURE 2 is a perspective view of the inner bearing race spacer-sleeve of FIGURE 1, in its unmounted condition.

Referring to FIGURE 2, there is seen a second spacer broadly indicated by reference numeral 10.

Spacer 10 comprises a tubular sleeve 11 having an inside diameter adapted to slidably receive the axle spindle 18 therethrough.

Sleeve 11 has an annular spacer ring 12 centered thereon, with end shoulders 13 and 14.

The widths of the annular spacers 25 and 12 are identical.

Reference numerals 19 and 20 indicate ball bearing assemblies, of the conventional type, having inner and outer races 23, 24, and 21, 22, respectively.

The ball bearing assembly 19 is immovably mounted in the hub bore 28 through a press fit and is positioned with its outer race 21 butted firmly against the end shoulder 31 of spacer 25.

The sleeve 11 of unit 10 is slidably inserted in the inner race 23 with the shoulder 13 of spacer ring 12 positioned against the end of the race 23, as seen in FIGURE 1.

The other bearing assembly 20 is then positioned by pressing its outer race 22 into the hub bore 28, against the shoulder 30 of spacer 25. At the same time the inner race 24 is slidably fitted over the sleeve 11 and positioned against the shoulder 14 of spacer ring 12.

The overall length of the sleeve is slightly less than the overall width of the so mounted bearing inner races 23 and 24.

The wheel is then mounted on the axle spindle 18 by sliding its sleeve 11 over the spindle until the inner race 23 of bearing 19 seats against the shoulder 17 of axle 16.

A castellated lock nut 27 is mounted on the threaded stud 26 and drawn up tightly against the end of the inner race 24 of bearing 20, without care being taken as to the amount of pressure exerted against the race 24, and a cotter pin is inserted through the nut slot that happens to be lined up with the stud bore to lock the nut against rotation.

The so mounted wheel 15 is now free to rotate frictionlessly on the spindle, without any pre-loading as to end thrust, due to the fact that the inner races 23 and 24 cannot be offset relative to the outer races 21 and 22, no matter how tightly the nut 27 is pressed against the inner race 24. The identical spacing between the shoulders 30, 31 of spacer 25 and shoulders 14 and 13 of the spacer 12, assures this. It will be noted, by gain referring to FIGURE 1, that there is solid metal-to-metal contact between the axle shoulder 17 and nut 27, through bearing, inner races 23, 24 and the sleeve spacer 12. Therefore, it is impossible to put any excess end thrust on these races. After the nut 27 is locked in place, a protective hub-cap 29 is pressed over the open end of the hub. In situations where it may be desirable to pre-load the bearings a pre-determined amount, the spacer ring 12 is intentionally made slightly narrower than the wheel hub spacer 25, as for example, .005″ narrower. Again, due to the solid metal-to-metal juxtaposition of the races and spacer, the nut 27 can only move the races 23 and 24 to the pre-determined pre-load, upon being drawn up tightly against the inner race 24. No skill or care need be exercised by the mechanic, so that such wheels can be easily and quickly mounted, with the assurance that they will rotate at optimum frictionless efficiency.

Furthermore such installation can be positively and easily duplicated each time any wheel is re-mounted without any special skill being required on the part of the mechanic.

It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

I claim:

1. In combination with a vehicle axle of the type having a right cylindrical wheel mounting spindle, said spindle being shouldered at its inner end and threaded at its outer end to receive a wheel retaining nut; a wheel bearing mount, comprising, a vehicle wheel having a hub bore therethrough, an annular spacer ring centered in the hub bore and projecting therein; a pair of ball-bearing assemblies mounted in the hub bore in spaced relation on either side of the hub spacer ring, through press fits, with the outer races thereof seated thereagainst; and, a cylindrical sleeve, having an outwardly projecting annular spacer ring centered thereon, slidably mounted in the inner races of the so mounted ball-bearing assemblies with its spacer ring centered therebetween, the width of the hub and sleeve spacer rings being identical, the cylindrical sleeve of the so journaled wheel being adapted to be slidably fitted over the aforesaid axle spindle, after which a retaining nut is screwed on to the threaded end of the spindle and drawn up tightly against the inner races of the bearing assemblies to lock same to the axle spindle by pressing them against the sleeve spacer ring and spindle shoulder in continuous metal-to-metal engagement.

2. A wheel bearing, as in claim 1, wherein the width of the sleeve spacer ring is less than that of the hub-bore spacer ring.

3. In combination with a vehicle axle of the type having a right cylindrical wheel mounting spindle, said spindle being shouldered at its inner end and threaded at its outer end to receive a wheel retaining nut; a wheel bearing mount, comprising, a vehicle wheel having a hub bore therethrough, an annular spacer ring centered in the hub bore and projecting therein; a pair of roller-bearing assemblies mounted in the hub bore in spaced relation on either side of the hub spacer ring, through press fits, with the outer races thereof seated thereagainst; and a cylindrical sleeve, having an outwardly projecting annular spacer ring centered thereon, slidably mounted in the inner races of the so mounted roller-bearing assemblies with its spacer ring centered therebetween, the width of the hub and sleeve spacer rings being identical, the cylindrical sleeve of the so journaled wheel being adapted to be slidably fitted over the aforesaid axle spindle, after which a retaining nut is screwed on to the threaded end of the spindle and drawn up tightly against the inner races of the bearing assemblies to lock same to the axle spindle by pressing them against the sleeve spacer ring and spindle shoulder in continuous metal-to-metal engagement.

4. A wheel bearing, as in claim 3, wherein the width of the sleeve spacer ring is less than that of the hub-bore spacer ring.

References Cited by the Examiner

UNITED STATES PATENTS 2,596,771　5/1952　Harbour _____ 308—236 X

FOREIGN PATENTS 714,468　3/1931　France.
406,049　11/1924　Germany.
26,848　　1913　Great Britain.

OTHER REFERENCES

"Progress in Preloading," published in American Machinist, Oct. 2, 1930, pp. 545 thru 548 relied upon.

MARTIN P. SCHWADRON, *Primary Examiner.*

FRANK SUSKO, *Examiner.*